United States Patent [19]
Brandberg et al.

[11] Patent Number: 5,895,293
[45] Date of Patent: Apr. 20, 1999

[54] FILTERED TERMINAL BLOCK ASSEMBLY

[75] Inventors: Philip Clay Brandberg, Carlisle; Gary Sui Wong, Elizabethtown, both of Pa.

[73] Assignee: The Whitaker Corporation, Wilmington, Del.

[21] Appl. No.: 08/842,122

[22] Filed: Apr. 23, 1997

[51] Int. Cl.$^6$ .................................................. H01R 13/66
[52] U.S. Cl. .................................................. 439/620
[58] Field of Search ...................... 439/620; 333/181–185

[56] References Cited

U.S. PATENT DOCUMENTS

| | | | |
|---|---|---|---|
| 3,930,210 | 12/1975 | Hollyday | 333/79 |
| 4,267,536 | 5/1981 | Hollyday | 333/186 |
| 4,374,369 | 2/1983 | Sakamoto et al. | 333/182 |
| 4,516,815 | 5/1985 | Venable et al. | 339/14 R |
| 5,032,692 | 7/1991 | DeVolder | 174/52.3 |
| 5,333,095 | 7/1994 | Stevenson et al. | 361/302 |

*Primary Examiner*—Gary F. Paumen

[57] ABSTRACT

A filtered terminal block assembly comprises a dielectric insert (20) having a cavity (48) including a pocket (50) and a bore (52), a ground plate (16) to which the dielectric insert (20) is disposed and having an opening (46) in alignment with the bore (52), a filter element (24, 26) having an inner end disposed in the cavity (48), an electrical contact (14) extending through the filter element (24, 26), the pocket (50) and the bore (52) with an outer end of the filter element (24, 26) electrically connected to the electrical contact (14), a ground member (22) electrically connected between the filter element (24, 26) and the ground plate (16), and an electrically-conductive thixotropic material (54) in the pocket (50) and along an inner surface of the cavity (48) electrically connecting an inner end of the filter element (24, 26) to the electrical contact (14).

8 Claims, 2 Drawing Sheets

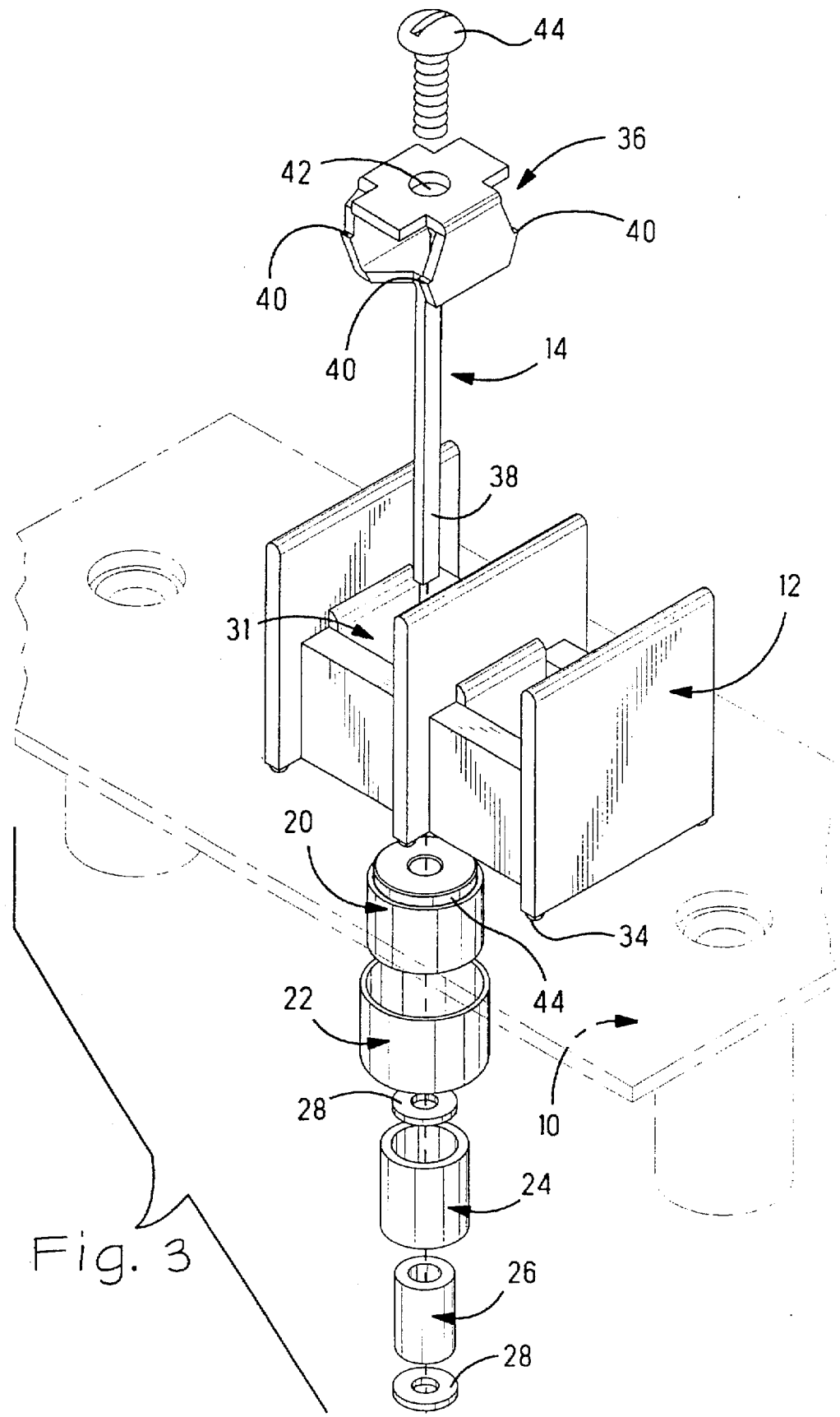

FILTERED TERMINAL BLOCK ASSEMBLY

FIELD OF THE INVENTION

The present invention relates to a terminal block assembly and more particularly to a filtered terminal block assembly which comprises a dielectric insert having a cavity in which an inner end of a filter element is disposed and electrically connected to an electrical contact, an outer end of the filter element is electrically connected to the electrical contact, and the filter element is electrically connected to a ground member.

BACKGROUND OF THE INVENTION

A commercial filtered terminal block assembly similar to that of the present invention requires more assembly operations which increases the cost of manufacturing it. A subassembly is first assembled which comprises placing a housing with electrical contacts therein onto assembly tooling, a plate of the assembly tooling is moved laterally and is positioned along a bottom surface of the housing with posts of the electrical contacts being located in slots of the plate, an inner metal washer, ferrite tubular bead and outer metal washer is placed onto each of the posts, tubular capacitors are placed onto the posts over the washers and ferrite tubular beads, solder is added to the outer washers whereafter the outer washers are soldered to the posts and the outer ends of the tubular capacitors. The plate is removed, solder is placed around the inner washers, then the inner washers are soldered to the posts and inner ends of the tubular capacitors thereby forming the subassembly.

The subassembly is then moved to other assembly tooling, a ground plate having holes through which the tubular capacitors extend is placed on the housing and centered so that the holes are centered relative to the tubular capacitors, tubular ground members are placed over the tubular capacitors and they rest on the ground plate, solder paste is applied onto the tubular ground members at the tubular capacitors and at the ground plate where the tubular ground members engage, the tubular ground members are then soldered to the tubular capacitors and the ground plate. Standoffs are then mounted onto the ground plate thereby completing the assembly of the commercial filtered terminal block assembly.

As can be discerned, the assembly of the various parts to form a filtered terminal block assembly requires a large number of assembly operations including three soldering operations and assembly tooling. It is desirable therefore, to reduce the number of assembly and soldering operations to provide filtered terminal block assemblies thereby reducing the cost of manufacturing the filtered terminal block assemblies.

SUMMARY OF THE INVENTION

An embodiment of the present invention reduces the assembly and soldering operations for making filtered terminal block assemblies. This is accomplished by the use of a thermoplastic insert which enables the number of assembly and soldering operations as well as assembly tooling to be reduced.

A filtered terminal block assembly comprises a dielectric insert having a cavity including a pocket and a bore extending through the insert, a ground plate to which the insert is disposed has an opening in alignment with the bore, a filter element has an inner end disposed in the cavity, an electrical contact extends through the filter element, the pocket and the bore with an outer end of the filter element electrically connected to the electrical contact, a ground member is electrically connected between the filter element and the ground plate, and an electrically-conductive thixotropic material in the pocket electrically connects an inner end of the filter element to the electrical contact.

A feature of the present invention is that the dielectric insert centers the filter element with respect to the ground plate and the electrical contact during the assembly of the filtered terminal block assembly.

A feature of the present invention is that the dielectric insert enables the parts of the filtered terminal block assembly to be assembled and then only a single soldering operation is needed to solder the outer end of the filter element to the electrical contact and the ground member to the filter element and the ground plate.

A further feature of the present invention is the use of an electrically-conductive thixotropic material in a pocket of a dielectric insert which electrically connects an inner end of the filter element to the electrical contact.

BRIEF DESCRIPTION OF THE DRAWINGS

An embodiment of the present invention will now be described by way of example with reference to the accompanying drawings in which:

FIG. 3 is an exploded perspective view of the parts of the filtered terminal block assembly.

DETAILED DESCRIPTION AN EMBODIMENT OF THE INVENTION

Figure 2:
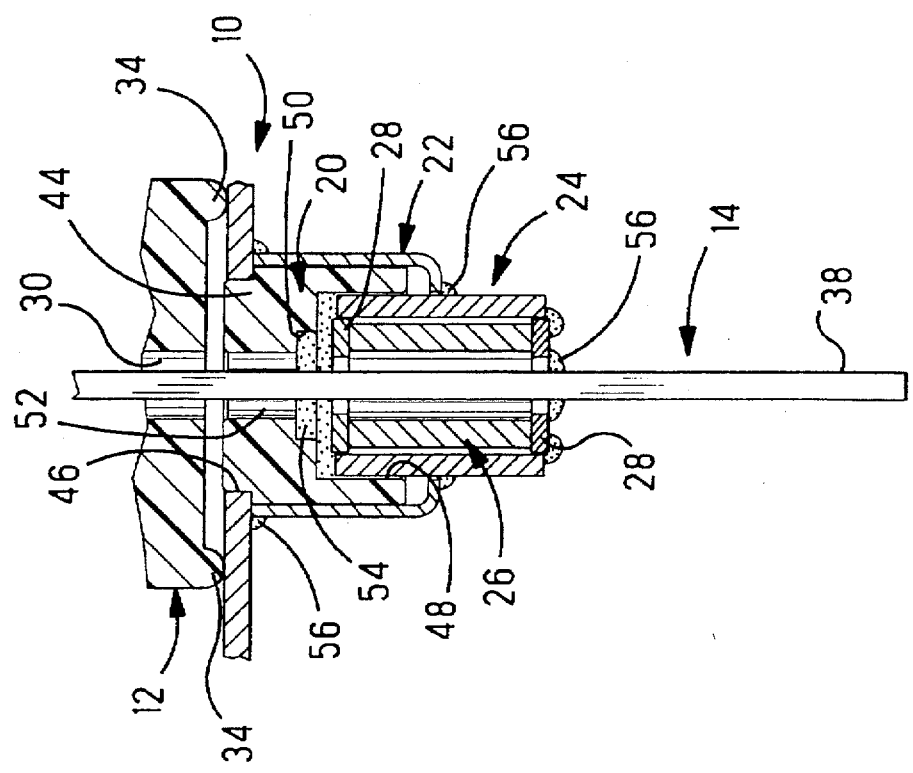
FIG. 2 is a cross-sectional view taken along line 2—2 of FIG. 1.
Figure 1:
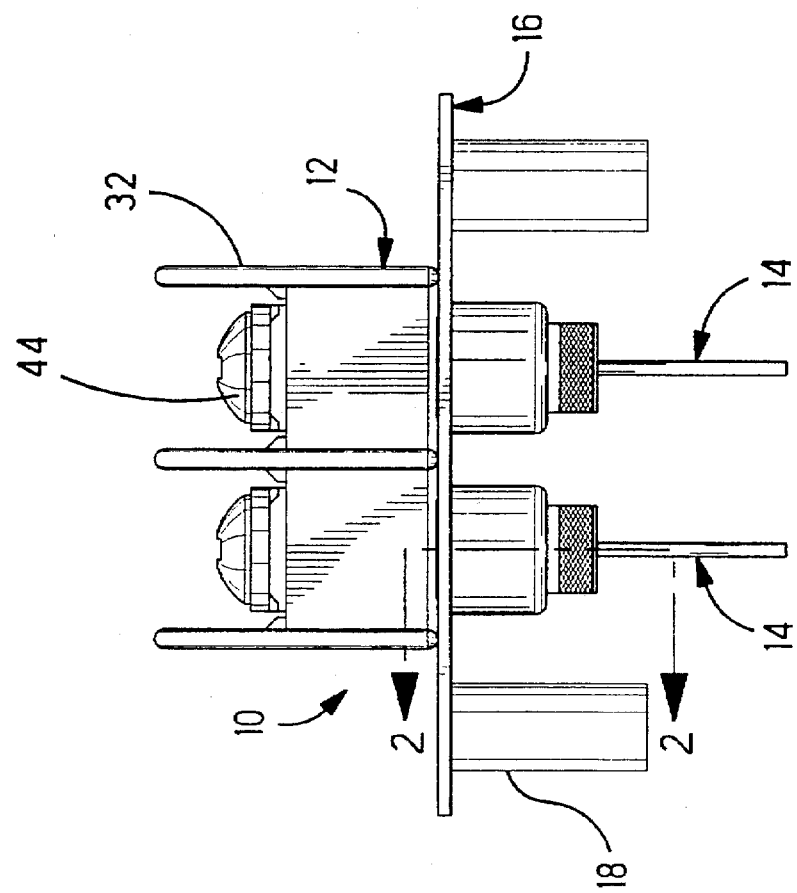
FIG. 1 is a front elevational view of a filtered terminal block assembly of the present invention.

A filtered terminal block assembly 10 is shown in FIGS. 1–3 which includes a dielectric housing 12, electrical contacts 14 secured in housing 12, a ground plate 16, standoffs 18, a dielectric insert 20, ground member 22, capacitor 24, ferrite member 26, and metal washers 28.

Dielectric housing 12 is molded from a suitable thermoplastic material and includes cavities 31 in which electrical contacts 14 are secured. Extensions 32 are provided on housing 12 to prevent adjacent electrical conductors to be connected to the electrical contacts from shorting. Projections 34 are located on a bottom surface of housing 12 to space housing 12 from ground plate 16. Whereas, housing 12 shows two electrical contacts 14, housing 12 can be formed to accommodate as many contacts as desired.

Electrical contacts 14 include a U-shaped contact section 36 and a post 38. Barbs 40 are located on the legs of contact section 36 which bite into the walls of cavities 31 when contact sections 36 are forced into cavities 31 thereby securing the contacts 14 within housing 12 with posts 38 extending through bores 30 in communication with cavities 31 and outwardly beyond the bottom surface of housing 12. The bights of U-shaped contact sections 36 have a threaded hole 42 to receive screws 44 to electrically connect an electrical conductor thereto. Posts 38 extend from one of the legs of the U-shaped contact sections and are centered with respect to threaded holes 42.

Dielectric insert 20 is molded from a suitable thermoplastic material in a circular configuration. An annular lip 44 extends outwardly from a bottom surface of insert 20 which has a diameter less than the diameter of insert 20 so as to fit within circular opening 46 of ground plate 16. Insert 20 includes a cavity 48, a pocket 50 and bore 52 in communication with each other and through which post 38 of electrical contact 14 extends as shown in FIG. 2.

Cavity 48 has a diameter to receive an inner end of circular capacitor 24. Inner washer 28 is disposed in cavity 48 with annular ferrite member 26 being positioned within circular capacitor 24 in engagement with inner washer 28. Outer washer 28 is positioned onto an outer end of ferrite member 26. Inner washer 28, ferrite member 26, circular capacitor 24 and outer washer 28 are positioned along post 38.

Electrically-conductive thixotropic material 54 is disposed in the bottom of cavity 48 and in pocket 50 which is in engagement with inner washer 28, the inner end of circular capacitor 24 and post 38 thereby effecting an electrical connection between circular capacitor 24, inner washer 28, and post 38.

Thixotropic material 54 is a soft, smooth flowable paste with appropriate handling characteristics that is commercially available from Epoxy Technology, Inc., Billerica, Mass. This material will harden when subjected to heat.

Ground member 22 is a tubular member that has an outer end disposed adjacent circular capacitor 24 about midway thereof and an inner end in engagement with ground plate 16.

Circular capacitor 24 has spaced inner conductive areas extending along an inner surface and an outer conductive area extending along an outer surface covering about two-thirds of a mid portion of the outer surface.

Outer washer 28 is positioned on post 38 in engagement with an outer end of ferrite member 26. Solder 56 is applied onto outer washer 28, the outer end of ground member 22 and on ground plate 16 along the inner end of ground member 22. Heat is applied to the assembly thereby causing the solder 56 to reflow thereby simultaneously soldering the outer washer 28, the outer end of circular capacitor 24 and post 38 together, the outer end of ground member 22 to circular capacitor 24 and the inner end of ground member 22 to ground plate 16. The heat for reflow soldering also cures thixotropic material 54.

The filtered terminal block assembly of the present invention is assembled with reduced assembly operations and a single soldering operation as sent forth hereinbelow. Housing 12 with electrical contacts 14 secured therein is positioned so that posts 38 extend upwardly. Ground plate 16 is placed on projections 34 of housing 12 with posts 38 extending through openings 46 of ground plate 16. Dielectric inserts 20 are moved along posts 38 with annular lips 44 being disposed in openings 46 of ground plate 16 thereby centering the openings 46 relative to posts 38 and posts 38 are also centered relative to bores 52, pockets 50 and cavities 48 of inserts 20. Thixotropic material 54 is deposited in pockets 50 and along a bottom surface of cavities 48 of inserts 20. Inner washers 28, ferrite members 26 and outer washers 28 are moved along posts 38 with inner washers 28 and an inner end of ferrite members 26 being disposed within cavities 48 and inner washers 28 being immersed within thixotropic material 54. Circular capacitors 24 are moved along posts 38 and along inner washers 28, ferrite members 26 and outer washers 28 until inner ends of the circular capacitors 24 are disposed within the thixotropic material 54. Tubular ground members 22 are moved along posts 38 along circular capacitors 24 and inserts 20 until the inner ends engage the ground plate 16. Solder is applied onto ground plate 16 around the inner ends of the tubular ground members 22, along the outer ends of the tubular ground members 22 and along the outer washers 28. Heat is applied to the solder causing it to reflow thereby simultaneously soldering the outer washers 28 and the outer ends of circular capacitors 24 to posts 38, the outer ends of the tubular ground members 22 to the outer conductive areas of the circular capacitors 24 and the inner ends of the tubular ground members 22 to the ground plate 16. The heat also causes the thixotropic material to cure thereby electrically connecting inner washers 28 and the inner ends of circular capacitors 24 to posts 38.

The soldering of the inner and outer ends of the circular capacitors 24 to the posts 38 and the outer conductive area of the circular capacitors to the tubular ground members 22 forms a Pi filter.

If desired, ferrite members 26 can be eliminated so that only circular capacitors 24 are used thereby providing capacitive filters instead of Pi filters.

As can be discerned from the foregoing, a filtered terminal block assembly has been described which is made with reduced assembly operations and a single soldering operation as an important advantage of the present invention. Another important advantage of the present invention is the use of a dielectric insert which enables the assembly operations to be reduced and a single soldering operation to be performed. A further important advantage of the present invention is the provision of an area in the dielectric insert in which electrically-conductive heat-curable material is disposed which forms an electrical connection between an inner end of a filter element positioned within the dielectric insert and a post of an electrical contact.

We claim:

1. A filtered terminal block assembly comprising a dielectric insert having a cavity including a bore extending through the insert;

a ground plate adjacent to which the dielectric insert is disposed and having an opening in alignment with the bore;

a filter element having an inner end disposed in the cavity;

an electrical contact extending through the filter element and the bore with an outer end of the filter element electrically connected to the electrical contact;

a ground member electrically connected between the filter element and the ground plate; and an electrical conductive thixotropic material in the cavity electrically connecting an inner end of the filter element to the electrical contact.

2. A filtered terminal block assembly as claimed in claim 1, wherein a pocket is located in a bottom surface of said cavity in which the thixotropic material is disposed.

3. A filtered terminal block assembly as claimed in claim 1, wherein said dielectric insert includes an annular lip for disposition in said opening of said ground plate thereby centering the filter element and the ground member relative to the electrical contact.

4. A filtered terminal block assembly as claimed in claim 1, wherein said filter element includes a ferrite tubular member disposed inside a circular capacitor.

5. A filtered terminal block assembly as claimed in claim 4, wherein said circular capacitor has spaced conductive areas along an inner surface and an outer conductive area disposed along an outer surface thereof.

6. A filtered terminal block assembly as claimed in claim 5, wherein said ground member is a tubular member with an outer end electrically connected to the outer conductive area of said circular capacitor and an inner end electrically connected to said ground plate.

7. A filtered terminal block assembly as claimed in claim 1, wherein said electrically-conductive thixotropic material is heat curable.

8. A filtered terminal block assembly as claimed in claim 1, wherein metal washers are located at inner and outer ends of said filter element.

* * * * *